United States Patent [19]

Kelsey

[11] Patent Number: 5,276,118
[45] Date of Patent: Jan. 4, 1994

[54] DIARYL CARBINOL METATHESIS CATALYSTS FOR RING-OPENING POLYMERIZATION OF CYCLIC OLEFINS

[75] Inventor: Donald R. Kelsey, Fulshear, Tex.

[73] Assignee: Shell Oil Company, Houston, Tex.

[21] Appl. No.: 999,034

[22] Filed: Dec. 31, 1992

[51] Int. Cl.$^5$ .......................... C08F 4/22; C08F 4/20; C08G 61/08
[52] U.S. Cl. ...................... 526/142; 526/134; 526/135; 526/140; 526/141; 526/143; 526/146; 526/147; 526/166; 526/169; 526/283; 526/308; 502/111; 502/117; 502/167; 502/168; 502/169; 502/172; 264/328.2; 264/331.13; 264/331.17
[58] Field of Search ............... 526/142, 143, 283, 308, 526/134, 166, 169, 135, 140, 141, 146, 147; 502/111, 167, 168, 169, 172, 117; 264/328.2, 331.13, 331.17

[56] References Cited

U.S. PATENT DOCUMENTS

| | | | |
|---|---|---|---|
| 3,933,778 | 1/1976 | Pampus et al. | 526/142 X |
| 4,729,976 | 3/1988 | Sjardijn et al. | 502/102 |
| 4,810,762 | 3/1989 | Sjardijn et al. | 526/166 |
| 4,981,931 | 1/1991 | Bell | 526/166 |
| 5,028,672 | 7/1991 | Sjardijn et al. | 526/128 |
| 5,071,812 | 12/1991 | Kelsey | 502/164 |
| 5,082,909 | 1/1992 | Bell | 526/169 |
| 5,093,441 | 3/1992 | Sjardijn et al. | 526/126 |
| 5,095,082 | 3/1992 | Kelsey | 562/282 |
| 5,142,006 | 8/1992 | Kelsey | 526/142 |
| 5,143,992 | 9/1992 | Kelsey | 562/283 |

OTHER PUBLICATIONS

Aldrich Chemical Co., Inc., "Catalog Handbook of Fine Chemicals", pp. 391, 699 (1992).
Aldrich Chemical Co., Inc., "Classes of Compounds and Numerical Cross Reference List", pp. 158-160 (1988).

*Primary Examiner*—Fred Teskin

[57] ABSTRACT

A catalyst and process for the metathesis polymerization of cyclic olefins, such as dicyclopentadiene, are disclosed. The catalyst comprises the reaction product of a transition metal halide preferably tungsten, molybdenum, or tantalum halides and a diaryl carbinol of the formula

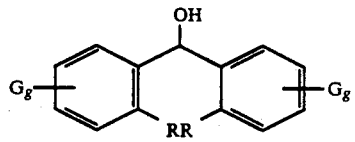

wherein G is independently $C_{1-12}$ alkyl, $C_{1-12}$ alkoxy, $C_{1-12}$ alkylamino, $C_{6-20}$ aryl, halide, or $C_{1-6}$ haloalkyl; g is independently 0 to 4; R is independently hydrogen or G or the R's are combined as a single bond or as a bridging group X, where X is $CH_2$, $CH_2CH_2$, O, S, SO, $SO_2$ or $NR^1$, and $R^1$ is H or $C_{1-6}$ alkyl. Optional cocatalysts include borohydrides, organo tin hydrides and organo aluminum compounds. Polymerization can be carried out in a reaction injection molding process to prepare a molded article.

20 Claims, No Drawings

DIARYL CARBINOL METATHESIS CATALYSTS FOR RING-OPENING POLYMERIZATION OF CYCLIC OLEFINS

BACKGROUND OF THE INVENTION

1. Field of the Invention

The present invention relates to an improved process and catalyst system for the ring-opening metathesis polymerization of cyclic olefins, such as dicyclopentadiene (DCPD). More specifically, this invention relates to an improved organo transition metal catalyst for metathesis polymerization.

2. Description of the Related Art

Cyclic olefins are subjected to ring-opening metathesis polymerization to produce thermoplastic and thermoset polymers having physical properties which make them suitable for structural and electronic applications, such as molded plastic items and electrical laminates. Such polymerizations are commonly carried out in reaction injection molding (RIM) processes, in which a metathesis catalyst and a monomer are charged to a heated mold, and polymerization of the monomer and forming of the polymer into the desired shape are carried out simultaneously in the mold.

In such RIM processes, it is important that the polymerization reaction occur rapidly and with as complete incorporation of the charged monomers as possible. For example, the presence of unreacted monomers in molded polydicyclopentadiene has been found to result in a molded part with an unpleasant odor, and less than optimum physical properties. Finding a RIM process that reacts in as short a cycle time as possible and at mold temperatures at or near room temperature is economically desirable. It is also advantageous to be able to use a less than pure monomer stream and thus avoid extensive purification of the monomer prior to polymerization.

Numerous patents and literature references relate to such polymerization in the presence of a variety of olefin metathesis catalysts. Among the more effective ring-opening polymerization catalysts are homogenous catalyst systems based on tungsten or molybdenum halides, often employed with an organotin or organoaluminum co-catalyst. Examples of such catalyst systems are disclosed by Sjardijn et al., U.S. Pat. Nos. 4,810,762 and 5,093,441, wherein phenolic tungsten halides are used with organotin hydrides. Similar catalyst systems are disclosed by Sjardijn et al. in U.S. Pat. No. 4,729,976, which have been found to be highly active in a relatively impure DCPD feed stream. While many such metathesis catalysts containing aryloxy ligands are known, these catalysts generally require the presence of a co-catalyst to achieve good reactivities.

Catalysts which exhibit high reactivity, especially in the absence of co-catalysts, are desirable to reduce polymerization cycle time and to lower the costs associated with the co-catalyst.

SUMMARY OF THE INVENTION

The present invention provides an improved cyclic olefin metathesis catalyst system for the ring-opening polymerization of cyclic olefins, such as dicyclopentadiene. More particularly the invention provides a catalyst system comprising the reaction product of a transition metal halide and a diaryl carbinol, and an optional co-catalyst. The transition metal halide is preferably a tungsten, or molybdenum halide or oxyhalide, most preferably a tungsten halide such as tungsten hexachloride. The diaryl carbinol may be optionally substituted with $C_{1-12}$ alkyl, $C_{1-12}$ alkoxy, $C_{1-12}$ alkylamino, $C_{6-20}$ aryl, halide, or $C_{1-6}$ haloalkyl (such as trifluoromethyl), or any combinations thereof. The preferred diaryl carbinol is 9-hydroxyfluorene and substituted derivatives thereof. The catalyst of this invention can be used with a co-catalyst such as organo tin hydrides, borohydrides, or organo aluminum compounds.

The present invention also provides a process for the metathesis polymerization of cyclic olefins, specifically norbornenes such as dicyclopentadiene. The monomer is mixed with the above-described catalyst system, and the reaction mixture is injected into a mold under conditions sufficient for polymerization of the monomer and formation of a molded article.

DETAILED DESCRIPTION OF THE INVENTION

The Catalyst

The polymerization catalyst described herein is highly reactive in the ring-opening metathesis polymerization of cyclic olefins. Ring-opening metathesis catalysts facilitate the breaking of the monomer ring at double bonds to form linear and crosslinked unsaturated polymers.

The catalyst of the present invention comprises a transition metal halide complex prepared using an optionally substituted diaryl carbinol. The transition metal compounds useful as starting materials to make the catalysts of the instant invention are generally in the form of a salt, including such salts as halides and oxyhalides. Because of the high activity of the resultant catalyst, the transition metal is preferably a metal of Group VB and VIB such as tungsten, molybdenum or tantalum.

Examples of such transition metal halides include tungsten hexachloride, tungsten oxytetrachloride, tungsten oxytetrabromide, molybdenum oxytetrachloride, molybdenum trioxyhexachloride, molybdenum pentachloride, molybdenum oxytetrafluoride, molybdenum oxytrichloride and tantalum pentachloride.

The transition metal metathesis catalysts of this invention are the reaction products of the above transition metal salts with optionally substituted diaryl carbinols. The diaryl carbinol can be represented by the general formula:

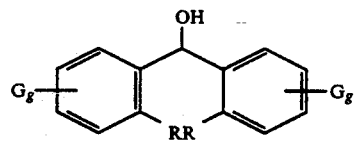

where G is independently $C_{1-12}$ alkyl, $C_{1-12}$ alkoxy, $C_{1-12}$ alkylamino, $C_{6-20}$ aryl, halide, or $C_{1-6}$ haloalkyl (e.g. trifluoromethyl); g is independently 0 to 4; R is independently hydrogen or G or the R's are combined as a single bond or as a bridging group X, where X is O (e.g. 9-hydroxyxanthene), —$CH_2$—, —$CH_2CH_2$— (e.g. dibenzosuberol), S, SO, $SO_2$ or $NR^1$; and $R^1$ is H or $C_{1-6}$ alkyl.

Examples of suitable substituted diaryl carbinols include diphenyl carbinol (benzhydrol), 9-hydroxyfluorene, 2-methylbenzhydrol, 4-methylbenzhydrol, 4-chlorobenzhydrol, 4,4'-dichlorobenzhydrol, 4,4'- difluorobenzhydrol, 2,3,4,5,6-pentafluorobenzhydrol, decafluorobenzhydrol, 4,4'-dimethoxybenzhydrol, 4,4'-bis(dimethylamino)benzhydrol, dibenzosuberol, 9-hydroxyxanthene, 2-chloro-9-hydroxyfluorene, 1,2,3,4,5,6,7,8-octafluoro-9-hydroxyfluorene, 2,7-dimethyl-9-hydroxyfluorene, 4,4'-bis(trifluoromethyl)benzhydrol, 4-phenylbenzhydrol, and 1-, 2-, 3-, and 4-nonyl-9-hydroxyfluorene. Preferred diaryl carbinols are the optionally substituted 9-hydroxyfluorenes, and 9-hydroxyfluorene is particularly preferred.

The diaryl carbinol will generally be present in the catalyst preparation in an amount of from about 0.5 to about 4 moles per mole of the transition metal halide, preferably from about 1 to about 2 moles.

The reaction product of transition metal halide and diaryl carbinol can be prepared by contacting, under an oxygen-free inert atmosphere, the diaryl carbinol compound and the transition metal compound each in an inert organic liquid with mild heat (about 25° C. to about 125° C., preferably about 30° C. to about 75° C.) and removal of generated hydrogen halide. Suitable inert organic liquids for the reaction include cyclopentane, cyclohexane, benzene, toluene, xylene, chlorobenzene and dichlorobenzene. The inert organic liquid is then preferably distilled off under vacuum. The reaction product is preferably stored neat at room temperature or dissolved in an inert organic solvent such as toluene.

THE CO-CATALYST

The catalyst of the present invention may be used in combination with one or more co-catalysts for accelerating the onset of the ring opening polycycloolefin polymerization. An example of a suitable co-catalyst is a borohydride co-catalyst, including those compounds which can be represented by the formula $[Y+][BH_mZ_n]^-$, in which $Y+$ represents an organic or organometallic cationic counterion, Z is a substituent group such as alkyl, cyano, halide, and the like, $m>0$ and $m+n=4$. Particularly preferred are borohydrides represented by the formula $[R^2{}_3P]_2[M+]BH_4^-$, in which each $R^2$ is independently selected from $C_{1-20}$, preferably $C_{2-12}$, hydrocarbyl, preferably aryl. Examples of such borohydrides include transition metal-based borohydrides such as bis(triphenylphosphine) copper (I) borohydride and ammonium borohydrides such as bis(triphenylphosphoranylidene) ammonium borohydride.

Effectiveness of the borohydride depends to some extent on its solubility in the monomer to be polymerized. Borohydrides with poor solubility such as sodium triethyl borohydride, sodium borohydride and tetrabutyl ammonium borohydride are generally not active co-catalysts in non-polar cyclic olefins such as DCPD. Preferred co-catalysts, because of their activity in DCPD and similar monomers, are those represented by the above borohydride formula in which $m=4$, $n=0$ and $Y+$ includes aromatic groups such as triarylphosphine and tetraaryldiphosphine, such as 1,2-bis(diphenylphosphine)ethane, moieties.

Suitable co-catalysts can also include, for example, an organo aluminum compound, including trialkyl aluminum, alkylaluminum dihalides, dialkyl aluminum halides or alkyl(alkyloxy) aluminum halides. Suitable co-catalysts can also include an organo tin hydride compound, including compounds which can be represented by the formula $Sn(R^3)_3H$, in which each $R^3$ is selected independently from hydrogen, substituted or unsubstituted aryl, or $C_{1-20}$ alkyl. Specific examples of such co-catalysts include ethyl aluminum chloride, diethyl aluminum chloride, trioctyl aluminum, tributyltin hydride, tripentyltin hydride, diphenyltin dihydride, trioctyltin hydride, methyldicyclohexyltin hydride, cyclopentyldimethyltin hydride, triphenyltin hydride, phenyldimethyltin hydride and allyltin trihydride. Tributyltin hydride, trioctyltin hydride, and triphenyltin hydride are preferred catalysts. Substituents on the $R^3$ groups in the above formula can include, for example, $C_{1-20}$ alkoxy and halides.

CATALYST SYSTEM

As used herein, the catalyst system composition comprises the transition metal halide catalyst and optionally a co-catalyst, a moderator or a boron halide promoter. The co-catalyst can be present in the catalyst system composition in an amount effective to enhance the activity of the transition metal halide catalyst, which will vary depending upon the specific components present and the reaction conditions. In general, the co-catalyst can be present in a molar amount of from about 15:1 to about 0.5:1, preferably from about 8:1 to about 1:1, based on moles of transition metal catalyst.

The catalyst system may optionally include a moderator to delay the initiation of polymerization if the selected catalyst and co-catalyst cause instant polymerization upon contact. Ethers, esters, ketones, nitriles and polar cyclic olefins are among suitable moderators for catalyst systems comprising tungsten catalyst and alkyl aluminum co-catalyst. Ethyl benzoate, butyl ether bis(2-methoxyethyl) ether and polar cyclic olefins are preferred moderators. Moderators are generally not necessary for catalyst systems having a tin hydride or borohydride co-catalyst.

The catalyst system may also optionally include a boron halide promoter, including boron trihalides, boron trihalide complexes and tetrahaloborates. The boron promoter can be, for example, such boron halides as boron tribromide, boron trifluoride, boron trifluoride diethyl ether complex, boron trifluoride dibutyl ether complex, boron trifluoride ethylamine, tetrafluoroboric acid diethyl ether, methyl boron difluoride, phenyl boron dichloride, triphenylmethyl fluoroborate, ammonium tetrafluoroborate, bis(2-ethyl-1-hexyl)ammonium tetrafluoroborate, boron trichloride dimethylsulfide, boron trifluoride alcohol complexes, and the like. The boron compound will be present in the polymerization reaction mixture in an amount effective to promote polymerization of the cyclic olefin monomer, generally from about 0.01 to about 10 moles, preferably from about 0.05 to about 2 moles, per mole of transition metal. The optimum level will vary depending upon the catalyst and the co-catalyst, and amounts of boron halide above the optimum may inhibit polymerization. The presently-preferred boron halides, because of their high activity and stability, are boron trifluoride and its ethyl ether and butyl ether complexes.

POLYMERIZATION

The polymerization process of the invention involves contacting one or more cyclic olefin monomers with the catalyst system composition. Preferred cyclic olefin monomers and comonomers include polycycloolefins containing a norbornene (bicyclo-[2.2.1]heptene) group which can be represented by the structural formulas:

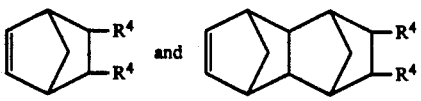

in which each $R^4$ is selected independently from hydrogen, $C_{1-20}$ alkyl, $C_{1-20}$ alkenyl, $C_{3-8}$ cycloalkyl, $C_{3-8}$ cycloalkenyl and $C_{6-20}$ aryl and, with $R^4$ groups linked together through carbon atoms, saturated and unsaturated cyclic hydrocarbon groups. Included in such monomers and comonomers are dicyclopentadiene, norbornene, norbornadiene, 5-(2-propenyl)norbornene, cyclohexenylnorbornene, and the like; and adducts of vinylcyclohydrocarbons, e.g. 4-vinylcyclohexene and cyclopentadiene or 3,5-divinylcyclopentene and cyclopentadiene and others as described in Kelsey, U.S. Pat. Nos. 5,095,082 and 5,143,992. Commercial cyclic olefins are available at various levels of purity, ranging from about 92 to about 99.9, the upper purity ranges being the result of distillation and further treatment for removal of contaminants and olefins which would be co-polymerized under polymerization conditions. As a general rule, transition metal catalysts employing an alkyl aluminum compound as co-catalyst require a high-purity monomer for acceptable polymerization activity, while the use of a tin hydride or borohydride co-catalyst permits the use of lower purity, technical-grade (83-95%) dicyclopentadiene monomer. An advantage of the invention catalyst is that it is very active in relatively impure (90-95%) dicyclopentadiene.

The ring-opening polymerization of the invention is conducted by contacting the cycloolefin monomer and the catalyst system under polymerization conditions. It is, on some occasions, useful to provide an inert diluent in order to solubilize the catalyst system components. Any co-catalyst is generally combined with the transition metal catalyst in the reaction mixture as a solution with the monomer to be polymerized. The boron halide promoter, if used, is generally combined with the transition metal and/or co-catalyst solution. The catalyst system components will typically have the necessary solubility in the cycloolefin to be polymerized and in the preferred embodiment no added diluent is employed and the catalyst system components and the cycloolefinic monomer are contacted directly. Suitable polymerization conditions for such contacting include a polymerization temperature of from about 20° C. to about 250° C. with polymerization temperatures from about 30° C. to about 150° C. being preferred. The polymerization pressure is that pressure required to maintain the polymerization mixture in a non-gaseous state. Such pressures will vary with the reaction temperature but pressures up to about 5 atmospheres are satisfactory and frequently ambient pressure is suitable and is preferred.

The inventive polymerization process is preferably carried out by reaction injection molding (RIM), in which a solution of the catalyst system, preferably in the monomer liquid to be polymerized, is injected into a mold simultaneously with the monomer, in liquid form, to be polymerized. The catalyst is generally employed in a molar ratio of RIM monomer to transition metal (mole:mole) of from about 200:1 to about 12,000:1, preferably about 500:1 to about 8000:1, most preferably about 1000:1 to about 5000:1.

In an illustrative polymerization, the monomer and catalyst system are mixed at a relatively low temperature at which rapid polymerization does not occur. The relatively low reaction rate permits efficient mixing or other processing of the polymerization mixture including the incorporation of fillers, reinforcements, antioxidants, stabilizers, pigments, elastomers or other materials provided to influence the properties of the polymerization product. A particularly contemplated embodiment of the process is in a reaction injection molding (RIM) process. Because of the relatively low initial rate of reaction, the monomer and catalyst system are mixed, typically by providing each component of the catalyst system with a portion of the cycloolefinic monomer, and the mixture is then transferred (injected) to a suitable mold including those molds for the production of large castings of complex shape. Notwithstanding the low initial reaction rate, the mixing and transfer must be accomplished rather quickly, for in a typical RIM process, the mixing/transfer time is on the order of a few seconds. Moreover, shortly after mixing of the monomer and catalyst system, a significant reaction exotherm occurs which substantially increases the temperature of the polymerizing mixture. While such an exotherm is at least in part beneficial in that the time for polymerization in the mold is reduced, it also requires that processing of the polymerization mixture be rapidly completed.

In an alternative RIM polymerization technique, a stream of the transition metal catalyst component in the monomer to be polymerized and a monomer stream containing any co-catalyst employed are combined in the mixing head of a RIM machine just prior to injection of the combined stream into a mold. The boron halide promoter, if used, is injected into the mixing head with the transition metal stream, with the co-catalyst stream, or in a separate monomer solution stream.

The initial mold temperature will generally be within the range of about 20° to about 200° C., preferably about 30° to about 150° C. The mold pressure is generally within the range of about 10 to about 50 psi. After injection of the catalyst and monomer into the mold, there is an interval of time, called the "induction time," before onset of a rapid exotherm from the exothermic polymerization reaction. In a commercial RIM process, this induction time should be sufficiently long to permit filling of the mold, typically about 2 minutes, preferably less than thirty seconds. Once the polymerization reaction is initiated, polymerization should occur quite rapidly, usually within about 10 seconds to about 1 minute, and is accompanied by a rapid rise in temperature.

Various optional components can be present in the reaction mixture during polymerization, including solvents, fillers, anti-oxidants, flame retardants, blowing agents, stabilizers, foaming agents, pigments, plasticizers, reinforcing agents and impact modifiers. Particularly preferred is the addition of from about 1 to about 10 weight percent, based on the weight of the monomer, of an elastomer for impact modification of the polymer. These components are most conveniently added to the reaction as constituents of one or more of the reaction mixture streams, as liquids or as solutions in the monomer.

After the polymerization reaction is complete, the molded object may be subjected to an optional postcure treatment at a temperature in the range of about 100° to about 300° C. for about 1 to 24, preferably about 1 to 2 hours. Such a postcure treatment can enhance certain polymer properties, including glass transition temperature.

The polymerized products of this invention are soluble linear thermoplastic polymers or hard, insoluble, crosslinked thermoset polymers having utility such as parts for cars, agriculture, housings for instruments or machines, in electronics, and marine applications.

The invention is further described by the following example which should not be regarded as limiting.

EXAMPLE I

In a nitrogen glove box, a reaction flask was charged with 0.813 g (2.05 mmol) of resublimed grade tungsten hexachloride and 20 mL of toluene that had been dried four times over molecular sieves and degassed. A dried serum bottle was charged with 37.35 g (2.05 mmol) of a 1% solution of 9-hydroxyfluorene in toluene. The 9-hydroxyfluorene solution had been dried three times over molecular sieves. A second serum bottle was charged with 10 mL dry toluene. The reaction flask and serum bottle were transferred to the hood. The reaction flask was connected to an argon source and heated to about 70° C. The 9-hydroxyfluorene solution was added via syringe over about 25 minutes and rinsed in with the 10 mL toluene. The solution was then heated and stirred at about 70° C. for about 26 hours under a flow of argon to remove the HCl byproduct (about 3 millimoles based on the weight increase of the polyvinylpyridine trap connected to the reaction flask), and the toluene was then removed by distillation to give a dark solid residue.

EXAMPLE II

The catalyst as described in Example I above was used in a laboratory polymerization of dicyclopentadiene (DCPD) (about 94% pure). The polymerizations of 16 g DCPD were carried out in a 90° C. oil bath. The following table shows the polymerization results with or without tributyltin hydride co-catalyst. Polymerization of dicyclopentadiene results in good polymerization without co-catalyst, but in the presence of tri-n-butyltin hydride co-catalyst a somewhat faster onset is achieved.

| Polymerization of 16 g Dicyclopentadiene with Catalyst of Example I ||||||
|---|---|---|---|---|---|
| Catalyst (mmol) | Co-Catalyst | Co-Catalyst (mmol) | Onset Time (min.) | Onset Temp. (°C.) | Maximum Time (min.) | Maximum Temp. (°C.) |
| 0.059 | Tributyltin hydride | 0.236 | 3.00 | 64.4 | 4.70 | 197.0 |
| 0.122 | None | 0.000 | 4.50 | 90.4 | 5.10 | 210.0 |
| 0.059 | None | 0.000 | NE[a] | NE | | |

[a]NE = no exotherm

While various modifications and changes will be apparent to one having ordinary skill in the art, such changes are included in the spirit and scope of this invention as defined by the appended claims.

What is claimed is:

1. A cyclic olefin metathesis polymerization catalyst composition comprising the reaction product of a transition metal halide and a diaryl carbinol of the formula

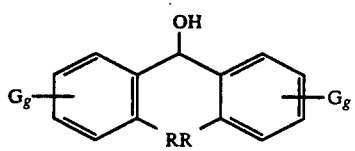

in which G is independently $C_{1-12}$ alkyl, $C_{1-12}$ alkoxy, $C_{1-12}$ alkylamino, $C_{6-20}$ aryl, halide, or $C_{1-6}$ haloalkyl; g is 0 to 4; R is independently hydrogen or G, or the R's are combined as a single bond or as a bridging group X, where X is $CH_2$, $CH_2CH_2$, O, S, SO, $SO_2$ or $NR^1$ and $R^1$ is H or $C_{1-6}$ alkyl.

2. The composition of claim 1 in which the transition metal halide is a tungsten, molybdenum or tantalum halide or oxyhalide.

3. The composition of claim 2 in which the transition metal halide is selected from the group consisting of tungsten hexachloride, tungsten oxytetrachloride, tungsten oxytetrabromide, molybdenum oxytrichloride, molybdenum pentachloride, molybdenum oxytetrafluoride, molybdenum trioxyhexachloride, and tantalum pentachloride.

4. The composition of claim 1 in which the diaryl carbinol is an optionally substituted 9-hydroxyfluorene.

5. The composition of claim 1 in which the diaryl carbinol is selected from the group consisting of benzhydrol, 9-hydroxy-fluorene, 2-methylbenzhydrol, 4-methylbenzhydrol, 4-chlorobenzhydrol, 4,4'-dichlorobenzhydrol, 4,4'-difluorobenzhydrol, 2,3,4,5,6-pentafluorobenzhydrol, decafluorobenzhydrol, 4,4'-dimethoxybenzhydrol, 4,4'-bis(dimethylamino)benzhydrol, dibenzosuberol, 9-hydroxyxanthene, 2-chloro-9-hydroxyfluorene, 1,2,3,4,5,6,7,8-octafluoro-9-hydroxyfluorene, 2,7-dimethyl-9-hydroxyfluorene, 4,4'-bis(trifluoromethyl)benzhydrol, 4-phenylbenzhydrol, 1-nonyl-9-hydroxyfluorene, 2-nonyl-9-hydroxyfluorene, 3-nonyl-9-hydroxyfluorene, and 4-nonyl-9-hydroxyfluorene.

6. The composition of claim 1 in which the diaryl carbinol is present in an amount within the range of about 0.5 to about 4 moles per mole of the transition metal halide.

7. The composition of claim 1 which further comprises a co-catalyst selected from the group consisting of organo tin hydrides, borohydrides, and organo aluminum compounds.

8. The composition of claim 7 wherein the co-catalyst is tributyltin hydride.

9. The composition of claim 1 in which the transition metal halide is tungsten hexachloride and the diaryl carbinol is 9-hydroxyfluorene.

10. A polymerization mixture comprising the catalyst of claim 1 and a cyclic olefin.

11. The mixture of claim 10 in which the cyclic olefin comprises dicyclopentadiene.

12. A process for in-mold polymerization of a cycloolefin monomer which comprises:

(a) introducing into a mold a reaction mixture comprising the cycloolefin monomer, a catalyst comprising a reaction product of a transition metal halide and a diaryl carbinol of the formula

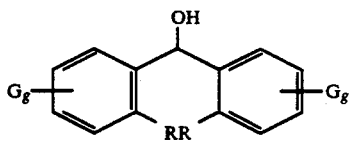

in which G is independently $C_{1-12}$ alkyl, $C_{1-12}$ alkoxy, $C_{1-12}$ alkylamino, $C_{6-20}$ aryl, halide, or $C_{1-6}$ haloalkyl; g is independently 0 to 4; R is independently hydrogen or G, or the R's are combined as a single bond or as a bridging group X, where X is O, $CH_2$, $CH_2CH_2$, S, SO, $SO_2$ or $NR^1$ and $R^1$ is H or $C_{1-6}$ alkyl; and (b) maintaining the reaction mixture under polymerization conditions for a time sufficient for polymerization of the monomer and formation of a molded article.

13. The process of claim 12 in which the diaryl carbinol is an optionally substituted 9-hydroxyfluorene.

14. The process of claim 13 in which the cycloolefin monomer comprises dicyclopentadiene.

15. The process of claim 12 in which the diaryl carbinol is selected from the group consisting of benzhydrol, 9-hydroxy-fluorene, 2-methylbenzhydrol, 4-methylbenzhydrol, 4-chlorobenzhydrol, 4,4'-dichlorobenzhydrol, 4,4'-difluorobenzhydrol, 2,3,4,5,6-pentafluorobenzhydrol, decafluorobenzhydrol, 4,4'-dimethoxybenzhydrol, 4,4'-bis(dimethylamino)benzhydrol, dibenzosuberol, 9-hydroxyxanthene, 2-chloro-9-hydroxyfluorene, 1,2,3,4,5,6,7,8-octafluoro-9-hydroxyfluorene, 2,7-dimethyl-9-hydroxyfluorene, 4,4'-bis(trifluoromethyl)benzhydrol, 4-phenylbenzhydrol, 1-nonyl-9-hydroxyfluorene, 2-nonyl-9-hydroxyfluorene, 3-nonyl-9-hydroxyfluorene, and 4-nonyl-9-hydroxyfluorene.

16. The process of claim 12 in which the transition metal halide is tungsten hexachloride, tungsten oxytetrachloride, tungsten oxytetrabromide, molybdenum oxytrichloride, molybdenum pentachloride, molybdenum oxytetrafluoride, molybdenum trioxyhexachloride, or tantalum pentachloride.

17. The process of claim 12 in which the reaction mixture further comprises a co-catalyst selected from the group consisting of organo tin hydrides, borohydrides, and organo aluminum compounds.

18. The process of claim 17 wherein the organo tin hydride is tributyltin hydride.

19. The process of claim 12 in which the reaction mixture is introduced into the mold at an initial mold temperature within the range of about 30° C. to about 150° C.

20. The process of claim 12 in which the transition metal halide is tungsten hexachloride and the diaryl carbinol is 9-hydroxyfluorene.

* * * * *